United States Patent [19]

Hirakawa et al.

[11] Patent Number: 5,579,224
[45] Date of Patent: Nov. 26, 1996

[54] DICTIONARY CREATION SUPPORTING SYSTEM

[75] Inventors: Hideki Hirakawa; Akira Kumano, both of Kanagawa-ken, Japan

[73] Assignee: Kabushiki Kaisha Toshiba, Kawasaki, Japan

[21] Appl. No.: 309,443

[22] Filed: Sep. 20, 1994

[30] Foreign Application Priority Data

Sep. 20, 1993 [JP] Japan ..................... 5-232649

[51] Int. Cl.⁶ .................................................. G06F 19/00
[52] U.S. Cl. .................................................. 395/752
[58] Field of Search .................. 364/419.11, 419.02, 364/419.04, 419.07, 419.08

[56] References Cited

U.S. PATENT DOCUMENTS

| | | | |
|---|---|---|---|
| 5,010,486 | 4/1991 | Suzuki et al. | 364/419.05 |
| 5,225,981 | 7/1993 | Yokogawa | 364/419.02 |
| 5,276,616 | 1/1994 | Kuga et al. | 364/419.08 |
| 5,323,310 | 6/1994 | Robinson | 364/419.02 |
| 5,373,441 | 12/1994 | Hirai et al. | 364/419.02 |

FOREIGN PATENT DOCUMENTS 2194084  2/1988  United Kingdom .

OTHER PUBLICATIONS

Matsudaira et al., "Japanese, English Bidirectional Machine Translation System Pensee", International Symposium on Electronic Dictionaries–ISED, (1988). Manuscripts and Program, pp. 25–28.

Riloff et al., "Automated Dictionary Construction for Information Extraction From Text", IEEE Conference on Artificial Intelligence for Applications, (1993), pp. 93–99.

*Primary Examiner*—Donald E. McElheny, Jr.
*Attorney, Agent, or Firm*—Foley & Lardner

[57] ABSTRACT

A dictionary creation supporting system capable of improving the efficiency of the dictionary creation process for the dictionary such as the user dictionary. In the system, a first language document and a corresponding second language document are entered, and each first language character string to be registered in the dictionary is extracted from the first language document. Then, each corresponding second language character string with respect to each first language character string is selectively extracted from the corresponding second language document according to a level of correspondence between a section of the first language document from which each first language character string is extracted and a section of the corresponding second language document to which each corresponding second language character string belongs, and each first language character string and each corresponding second language character string are selectively outputted as a candidate for a registration knowledge to be registered in the dictionary according to the level of correspondence.

26 Claims, 12 Drawing Sheets

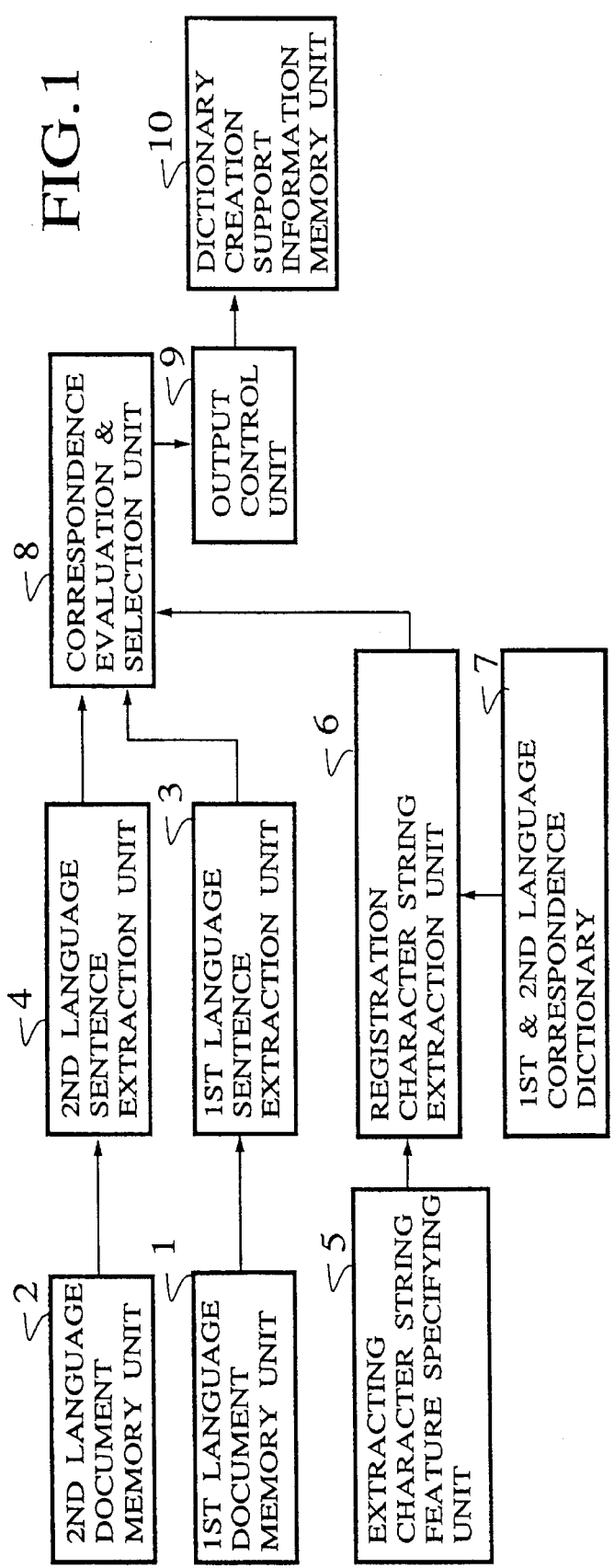

FIG.3

| SENTENCE NUMBER | STARTING POSITION | CHARACTER STRING |
|---|---|---|
| 1 | 0 | Document file creation (NEW LINE) |
| 2 | 23 | This system creates 3 kinds of files ; program file, document file and execution module file. |
| 3 | 128 | This section describes how to create document files. |
| 4 | 182 | The next section shows the procedures for other files. |
| 12 | 630 | No text files are included in the software. |
| 17 | 752 | Those files for the text show the features. |

FIG.4A

REGISTRATION KNOWLEDGE INFO. 1 = [type="合成語(GOSEIGO)", midashi="文書ファイル(BUNSHO-FAIRU)", hinshi="名詞(MEISHI)", deftgt="text file", isa="ファイル(FAIRU)"]

ORIGINAL SENTENCE INFO. 1 = [sid=1, mds=(0-12)]

TRANSLATED SENTENCE INFO. 1-1 = [sid=1, score=60, tgtcand=(0-14="document file"), context=(14-18/15-23)]

TRANSLATED SENTENCE INFO. 1-2 = [sid=2, score=30, tgtcand=(0-14="document file"), context=(14-18/12-19)]

TRANSLATED SENTENCE INFO. 1-3 = [sid=3, score=50, tgtcand=(37-51="document file"), context=(14-18/30-36)]

FIG.4B

REGISTRATION KNOWLEDGE INFO. 2 = [type="合成語(GOSEIGO)", midashi="文書ファイル(BUNSHO-FAIRU)", hinshi="名詞(MEISHI)", deftgt="text file", isa="ファイル(FAIRU)"]

ORIGINAL SENTENCE INFO. 2 = [sid=3, mds=(10-22)]

TRANSLATED SENTENCE INFO. 2-1 = [sid=1, score=30, tgtcand=(0-14="document file"), context=(24-28/15-23)]

TRANSLATED SENTENCE INFO. 2-2 = [sid=2, score=30, tgtcand=(52-64="document file"), context=(24-28/12-19)]

TRANSLATED SENTENCE INFO. 2-3 = [sid=3, score=50, tgtcand=(37-51="document file"), context=(0-4/0-12, 24-28/30-36, 48-52/13-22)]

TRANSLATED SENTENCE INFO. 2-4 = [sid=12, score=20, tgtcand=(3-13="text file")]

TRANSLATED SENTENCE INFO. 2-5 = [sid=17, score=10, tgtcand=(6-24="file for the text"), context=(48-52/25-29)]

FIG.4C

OUTPUT INFORMATION SOURCE FILE

REGISTRATION KNOWLEDGE INFO.
　TYPE, HEADER CHARACTER STRING, PART OF SPEECH, TRANSLATION, OTHER INFO.

ORIGINAL SENTENCE INFO.
　ORIGINAL SENTENCE ID, REGISTRATION KNOWLEDGE CORRESPONDENCE INFO.

TRANSLATED SENTENCE INFO.
　TRANSLATED SENTENCE ID, SCORE,
　REGISTRATION KNOWLEDGE CORRESPONDENCE INFO.,
　　CONTEXT CORRESPONDENCE INFO.

| TRANSLATED SENTENCE INFO NUMBER | SENTENCE NUMBER | SCORE | | |
|---|---|---|---|---|
| | | A | B | TOTAL |
| 1 | 1 | 10 | 20 | 30 |
| 2 | 2 | 10 | 20 | 30 |
| 3 | 3 | 30 | 20 | 50 |
| 4 | 12 | 0 | 20 | 20 |
| 5 | 17 | 10 | 0 | 10 |

FIG.9

| SENTENCE NUMBER | STARTING POSITION | CHARACTER STRING |
|---|---|---|
| 1 | 0 | このシステムはすぐれた機能を多く持っている。 |
| ⋯ | ⋯ | |
| 15 | 2058 | 取っ手を持ちながら操作しなければならない。 |
| ⋯ | ⋯ | |
| 28 | 3701 | その部品を持つ場合は、充分に気をつける。 |

FIG.10

| SENTENCE NUMBER | STARTING POSITION | CHARACTER STRING |
|---|---|---|
| 1 | 0 | This system has a lot of good features. |
| ⋯ | ⋯ | |
| 17 | 1892 | You must operate it holding the knob. |
| ⋯ | ⋯ | |
| 36 | 3551 | Be careful when supporting the part. |

FIG.11

REGISTRATION KNOWLEDGE INFO. 1 = [type="動名詞(DOSHI-MEISHI)", midashi="持つ(MOTSU)", hinshi="動詞(DOSHI)", deftgt="have", object="特徴(TOKUCHOU)", dict="標準(HYOJUN)"]

ORIGINAL SENTENCE INFO. 1 = [sid=1, mds=(34-38), obj=(24-28)]

TRANSLATED SENTENCE INFO. 1-1 = [sid=1, score=0, tgtcand=(12-15="have"), objcand=(21-29="feature")]

TRANSLATED SENTENCE INFO. 1-1a = [sid=1, score=0, tgtcand=(12-15="have"), objcand=(21-30="function")]

TRANSLATED SENTENCE INFO. 1-1b = [sid=1, score=0, tgtcand=(12-20="provide"), objcand=(26-34="feature")]

REGISTRATION KNOWLEDGE INFO. 2 = [type="動名詞(DOSHI-MEISHI)", midashi="持つ(MOTSU)", hinshi="動詞(DOSHI)", deftgt="have", object="取っ手(TOTTE)", dict="標準(HYOJUN)"]

ORIGINAL SENTENCE INFO. 2 = [sid=15, mds=(8-12), obj=(0-6)]

TRANSLATED SENTENCE INFO. 2-1 = [sid=17, score=0, tgtcand=(21-28="hold"), objcand=(33-37="knob")]

REGISTRATION KNOWLEDGE INFO. 3 = [type="動名詞(DOSHI-MEISHI)", midashi="持つ(MOTSU)", hinshi="動詞(DOSHI)", deftgt="have", object="部品(BUHIN)", dict="標準(HYOJUN)"]

ORIGINAL SENTENCE INFO. 3 = [sid=28, mds=(10-14), obj=(4-8)]

TRANSLATED SENTENCE INFO. 3-1 = [sid=36, score=0, tgtcand=(16-26="support"), objcand=(31-36="part")]

FIG. 13

"文書ファイル(BUNSHO-FAIRU)"; "名詞(MEISHI)"; document file; isa="ファイル(FAIRU)";
DEFAULT TRANSLATION = text file
文書ファイルの作成
Document file creation
[1] ..... This section describes how to create document files.
(1) ..... 本節では、文書ファイルを作成する操作手順について説明する。
(3) ..... This section describes how to create document files.
(3) ..... 文書ファイルの作成
(1) ..... Document file creation "作業対象ファイル(SAKUSEI-TAISHO-FAIRU)"; "名詞(MEISHI)"; "ファイル(FAIRU)";
DEFAULT TRANSLATION = creation target file
[2] : このシステムの作成対象ファイルには、プログラム、文書ファイル、
      実行モジュールファイルの3種類がある。
(2) : This system creates 3 kinds of files; program file,
      document file and execution module file.

"プログラムファイル(PUROGURAMU-FAIRU)"; "名詞(MEISHI)"; program file; isa="ファイル(FAIRU)";
DEFAULT TRANSLATION=program file
[2] : このシステムの作成対象ファイルには、実行モジュールファイルの3種類がある。文書
      ファイル、実行モジュールファイルの3種類がある。
(2) : This system crates 3 kinds of files; program file,
      document file and execution module file.

FIG.14

"文書ファイル(BUNSHO-FAIRU)" ; "名詞(MEISHI)" ; document file ; isa="ファイル(FAIRU)" ;
DEFAULT TRANSLATION=text file

[1] : 文書ファイルの作成
(1) : Document file creation
(3) : This section describes how to create document files.

"プログラムファイル(PUROGURAMU-FAIRU)" ; "名詞(MEISHI)" ; program file ; isa="ファイル(FAIRU)" ;
DEFAULT TRANSLATION=program file

[2] : このシステムの作成対象は、文書ファイル以外にも、文書ファイル、
実行モジュールファイルの3種類がある。
(2) : This system creates 3 kinds of files ; program file,
document file and execution module file.

DICTIONARY CREATION SUPPORTING SYSTEM

BACKGROUND OF THE INVENTION

1. Field of the Invention

The present invention relates to a dictionary creation supporting system for supporting the creation of the dictionary to be used in the natural language processing system such as a machine translation system.

2. Description of the Background Art

In recent years, the machine translation system for automatically translating the sentences in the first language in the sentences in the second language by utilizing a computer has been attracting much attention. In the machine translation system, in principle, the input original sentence is segmented into prescribed processing units such as words or phrases by applying the morphological analysis and the syntactic analysis. Then, for each processing unit, the applicable translation rules and the corresponding translation word or phrase are determined by searching through the translation dictionary. Finally, the translation sentence is obtained by joining the determined translation words or phrases according to the prescribed translation sentence generation rules.

In general, such a machine translation system is provided with a user registration dictionary (user dictionary) and a user rule dictionary, in order to assist the effective use of tile system by an individual user having variety of individual demands and tastes. These dictionaries are usually given a higher priority over the standard dictionary in selecting the translation word or in applying the translation rule, such that the desired translation words can be outputted for the expressions unique to each user or document.

In a case of creating this type of dictionary for customization purpose such as the user dictionary or the user rule dictionary, a conventional procedure has been to make a collective registration of the dictionary registration data according to the bilingual translation list prepared by the user in advance, by utilizing either the user registration function provided in the system, or the interactively operated dictionary editing system.

In such a conventional procedure, however, when the terminology list is not prepared in advance, there is a need to carry out a tedious task of extracting the bilingual translation list from the already existing documents, and this task has been a very heavy burden on the user at a time of the dictionary creation.

Thus, conventionally, even though a tool for inputting and editing the user dictionary or the user rule dictionary has been available, there still remains a problem concerning the difficulty of the task for collecting the user dictionary information or the user rule information to be registered by using such a tool.

SUMMARY OF THE INVENTION

It is therefore an object of the present invention to provide a dictionary creation supporting system capable of improving the efficiency of the dictionary creation process for the user dictionary or the user rule dictionary, which takes the already existing original documents and translated documents as its inputs, and outputs the candidates for the registration data to be registered in the user dictionary or the user rule dictionary according to these inputs, along with the original document information and the translated document information which are useful for the user in editing the registration data candidates.

According to one aspect of the present invention there is provided a method for supporting a creation of a dictionary for a translation system which translates a first language into a second language, comprising the steps of: entering a first language document and a corresponding second language document; extracting each first language character string to be registered in the dictionary from the first language document entered at the entering step; selectively extracting each corresponding second language character string with respect to each first language character string from the corresponding second language document according to a level of correspondence between a section of the first language document from which each first language character string is extracted and a section of the corresponding second language document to which each corresponding second language character string belongs; and selectively outputting each first language character string extracted at the extracting step along with each corresponding second language character string extracted at the selectively extracting step as a candidate for a registration knowledge to be registered in the dictionary according to the level of correspondence.

According to another aspect of the present invention there is provided a system for supporting a creation of a dictionary for a translation system which translates a first language into a second language, comprising: means for entering a first language document and a corresponding second language document; means for extracting each first language character string to be registered in the dictionary from the first language document entered by the entering means; means for selectively extracting each corresponding second language character string with respect to each first language character string from the corresponding second language document according to a level of correspondence between a section of the first language document from which each first language character string is extracted and a section of the corresponding second language document to which each corresponding second language character string belongs; and means for selectively outputting each first language character string extracted by the extracting means along with each corresponding second language character string extracted by the selectively extracting means as a candidate for a registration knowledge to be registered in the dictionary according to the level of correspondence.

According to another aspect of the present invention there is provided a method for supporting a creation of a dictionary for a translation system which translates a first language into a second language, comprising the steps of: entering a first language document and a corresponding second language document; extracting each first language character string and each corresponding second language character string from the first language document and the corresponding second language document entered at the entering step, respectively; evaluating a level of correspondence between each first language character string and each corresponding second language character string extracted at the extracting step according to a first and second language correspondence dictionary storing corresponding words in the first and second languages; and selectively outputting each first language character string and each corresponding second language character string as a candidate for a registration knowledge to be registered in the dictionary according to the level of correspondence evaluated at the evaluating step.

According to another aspect of the present invention there is provided a system for supporting a creation of a dictionary for a translation system which translates a first language into a second language, comprising: means for entering a first language document and a corresponding second language document; means for extracting each first language character string and each corresponding second language character string from the first language document and the corresponding second language document entered by the entering means, respectively; evaluating a level of correspondence between each first language character string and each corresponding second language character string extracted by the extracting means according to a first and second language correspondence dictionary storing corresponding words in the first and second languages; and selectively outputting each first language character string and each corresponding second language character string as a candidate for a registration knowledge to be registered in the dictionary according to the level of correspondence evaluated by the evaluating means.

Other features and advantages of the present invention will become apparent from the following description taken in conjunction with the accompanying drawings.

BRIEF DESCRIPTION OF THE DRAWINGS

FIG. 1 is a block diagram of one embodiment of the dictionary creation supporting system according to the present invention.

FIG. 2 is an illustration of exemplary first language sentences used in the system of FIG. 1.

FIG. 3 is an illustration of exemplary second language sentences used in the system of FIG. 1, corresponding to FIG. 2.

FIGS. 4A and 4B are illustrations of exemplary output information obtained in the system of FIG. 1 from the first and second language sentences of FIGS. 2 and 3.

FIG. 4C is a diagrammatic illustration of an output information source file used in the system of FIG. 1.

FIG. 9 is an illustration of another exemplary first language sentences used in the system of FIG. 1.

FIG. 10 is an illustration of another exemplary second language sentences used in the system of FIG. 1, corresponding to FIG. 9.

FIG. 11 is an illustration of an exemplary output information obtained in the system of FIG. 1 from the first and second language sentences of FIGS. 9 and 10.

FIG. 13 is an illustration of one exemplary output form outputted by the operation of FIG. 12.

FIG. 14 is an illustration of another exemplary output form outputted by the operation of FIG. 12.

DETAILED DESCRIPTION OF THE PREFERRED EMBODIMENTS

Figure 5:
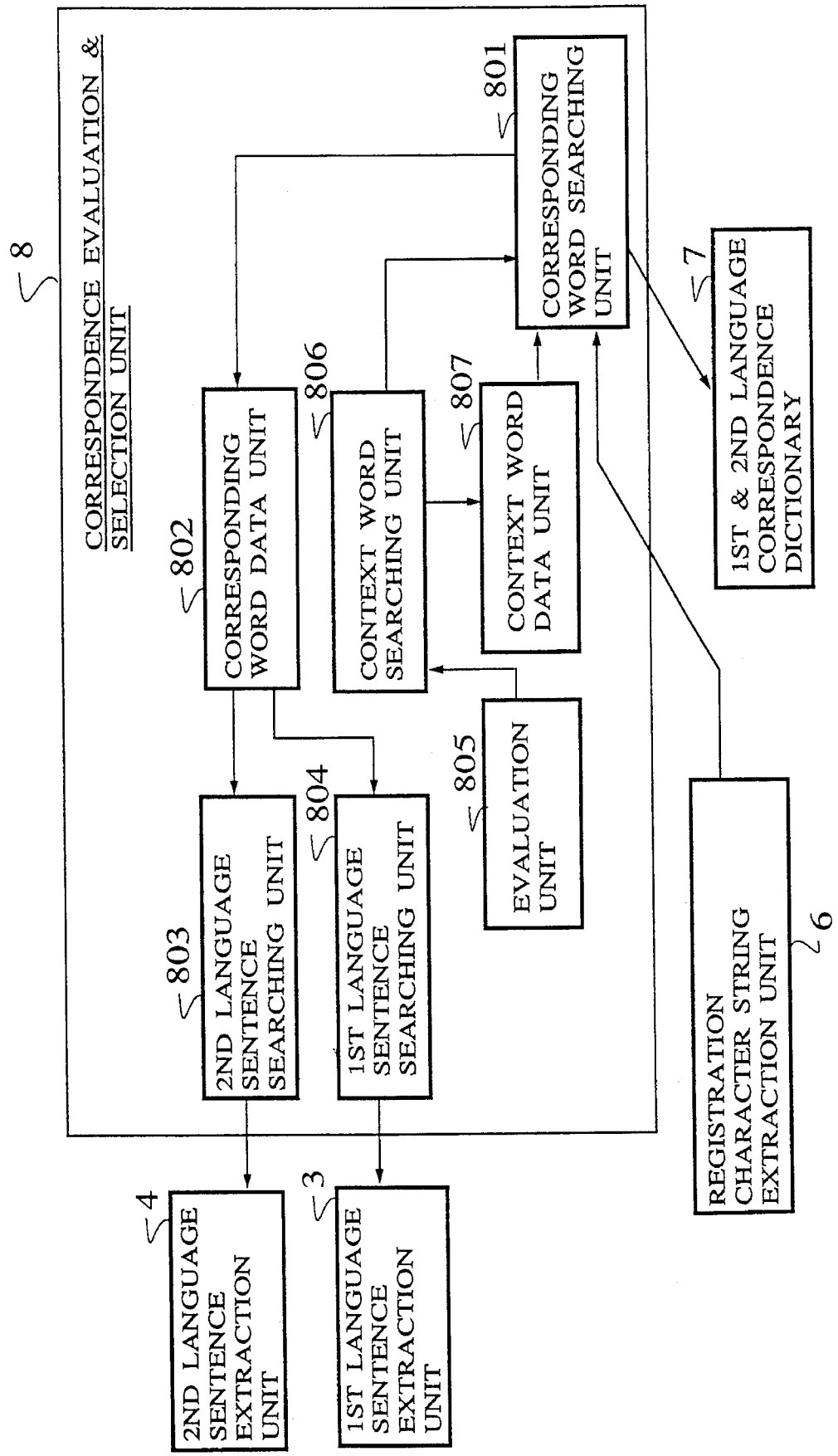
FIG. 5 is a block diagram of a detailed configuration of a correspondence evaluation and selection unit in the system of FIG. 1.

Referring now to FIG. 1, one embodiment of the dictionary creation supporting system according to the present invention will be described in detail, for an exemplary case of the translation from the Japanese original into English.

In this embodiment, the system has a configuration as shown in FIG. 1, which comprises: a first language document memory unit 1 for storing documents in the first language (Japanese); a second language document memory unit 2 for storing documents in the second language (English); a first language sentence extraction unit 3 for extracting each partial character string (sentence, phrase, etc.) constituting each document in the first language; a second language sentence extraction unit 4 for extracting each partial character string (sentence, phrase, etc.) constituting each document in the first language; an extracting character string feature specifying unit 5 for specifying a feature of the character string to be extracted; a registration character string extraction unit 6 for extracting each partial character string to be registered as knowledge from the character string (sentence) in the first language; a first and second language correspondence dictionary 7 for storing the correspondence relationship between the character strings (words, phrases, clauses, sentences) in the first and second languages; a correspondence evaluation and selection unit 8 for evaluating a level of correspondence between the partial character string (sentence, phrase, etc.) in the first language and the partial character string (sentence, phrase, etc.) in the second language; an output control unit 9 for constructing and outputting the dictionary creation support information according to the information from the registration character string extraction unit 6 and the correspondence evaluation and selection unit 8; and a dictionary creation support information memory unit 10 for storing the dictionary creation support information outputted from the output control unit 9.

The first language sentence extraction unit 3 carries out the recognition of a prescribed processing unit such as a sentence or a phrase in Japanese in each first language document stored in the first language document memory unit 1, and outputs each processing unit along with a position information indicating its position in each document. Here, the recognition of the processing unit is realized by utilizing a technique for extracting a sentence or a phrase according to the period or new line code information which has been utilized in the conventional natural language processing systems such as machine translation systems. The output of this first language sentence extraction unit 3 is in a form of a set of corresponding position information and extracted sentence (character string) in the first language (Japanese) as shown in FIG. 2, where the position information includes the sentence number (a unique number assigned to each extracted character string element in each document), and a starting position (a starting character position of each extracted character string element in each document).

The second language sentence extraction unit 4 carries out the recognition of a prescribed processing unit such as a sentence or a phrase in English in each second language document stored in the second language document memory unit 4, in the similar manner as the first language sentence extraction unit 3, and outputs the data in a form of a set of the corresponding position information and extracted sentence (character string) in the second language (English) as shown in FIG. 3. In this FIG. 3, the extracted sentences in English are those corresponding to the exemplary extracted sentences in Japanese shown in FIG. 2.

The extracting character string feature specifying unit 5 specifies the feature of the character string to be extracted, including any of the superficial feature, the lexicographic feature, the grammatical feature, and the structural feature.

Here, the superficial feature can be specified in such a manner as a word consisting of more than 10 characters, a word consisting solely of katakana (Japanese), a word consisting solely of capital letters (English), etc., for example. The lexicographic feature can be specified in such a manner as a word registered in both the special terminology dictionary and the general terminology dictionary, a word registered in the user dictionary without its translation, an unknown word, not registered in any dictionary, etc., for example. The grammatical feature can be specified in such a manner as a combination of connective verbs (Japanese) or a combination of a past participial verb+a noun (English), etc., for example. The structural feature can be specified in such a manner as a composite word constructed as a combination of a plurality of nouns, a verb without a subject, etc., for example.

The registration character string extraction unit 6 extracts the knowledge registration character string having a feature matching with the feature specified by the extracting character string feature specifying unit 5 by using the morphological analysis and the syntactic analysis.

More specifically, the first language sentence is morphologically analyzed first by using the word dictionary and the morphological analysis means, and then syntactically analyzed next by using the syntactic analysis rules and the syntactic analysis means. Here, the morphological analysis means and the syntactic analysis means can be furnished by any of the various known schemes. Then, the obtained analysis result and the feature specified by the extracting character string feature specifying unit 5 are matched with each other. For example, in a case the specified feature is the superficial feature, the matching can be made by checking the length of each word or the type of constituting characters for each word which is separated in the morphological analysis result. In a case the specified feature is the lexicographic feature, the matching can be made by checking the type of dictionary in which each word is registered and the type of dictionary in which each word is not registered, which have already been ascertained in the morphological analysis result. In a case the specified feature is the grammatical feature, the matching can be made by checking the part of speech, the conjugation, and the inflection of each word which have already been ascertained in the morphological analysis result. In a case the specified feature is the structural feature, the matching can be made by checking the syntactic structures such as the connection relationship and the modification relationship among the words which have already been ascertained in the syntactic analysis result.

For each of the knowledge registration character strings extracted according to the various features as described above, an information on that character string is registered as a registration knowledge information while a location in the original sentence from which that character string is extracted is registered as an original sentence information.

As shown in FIG. 4C, the registration knowledge information includes a type, a header character string, a part of speech, a translation, and other information. The type indicates a symbol representing the feature specified by the extracting character string feature specifying unit 5, such as "composite word", "katakana word", "unknown word", "verb without subject", etc. in the first language. The header character string indicates a character string in the first language extracted by the registration character string extraction unit 6 itself. The part of speech indicates a type of the part of speech for the header character string in the first language. The translation indicates a default translation in the second language of the header character string, which is obtained by utilizing the usual machine translation system. The other information indicates a symbol representing the dictionary in which this word is registered, an information on a broader category word of the header word, etc. in the first language.

On the other hand, the original sentence information includes an original sentence ID and a registration knowledge correspondence information, where the original sentence ID indicates a sentence number of the original sentence from which the character string is extracted, while the registration knowledge correspondence information indicates a number of bytes from the top of the original sentence at which the extracted character string starts and a number of bytes from the top of the original sentence at which the extracted character string ends.

In an exemplary case of extracting information for controlling the translation into the second language of a composite word formed by a plurality of nouns in the first language, the registration knowledge information and the original sentence information can be given as follows.

Namely, in a specific case of extracting a composite word "BUNSHO-FAIRU" (Japanese word generically meaning document file) located from the 0th byte to 12th byte of the sentence number 1 in FIG. 2 as the knowledge registration character string, as indicated in FIG. 4A, the registration knowledge information 1 has "GOSEIGO" (Japanese word meaning composite word) as the type (type), "BUNSHO-FAIRU" (in Japanese) as the header character string (midashi), "MEISHI" (Japanese word meaning noun) as the part of speech (hinshi), "text file" (in English) as the translation (deftgt), and "FAIRU" (Japanese word meaning file) as the other information (isa) which indicates the broader category word to which the composite word "BUNSHO-FAIRU" (in Japanese) belongs in this case. Similarly, for a case of extracting the same composite word "BUNSHO-FAIRU" (in Japanese) located from the 10th byte to 22nd byte of the sentence number 3 in FIG. 2 as the knowledge registration character string, as indicated in FIG. 4B, the registration knowledge information 2 has "GOSEIGO" (in Japanese) as the type (type), "BUNSHO-FAIRU" (in Japanese) as the header character string (midashi), "MEISHI" (in Japanese) as the part of speech (hinshi), "text file" (in English) as the translation (deftgt), and "FAIRU" (in Japanese) as the other information (isa) which indicates the broader category word to which the composite word "BUNSHO-FAIRU" (in Japanese) belongs in this case.

Here, when the system is equipped with thesaurus, "FAIRU" (in Japanese) registered as the broader category word can be obtained by using this thesaurus as the broader category word of the word "BUNSHO-FAIRU" (in Japanese), whereas when the system is not equipped with thesaurus, or when the thesaurus provided in the system does not contain this word "BUNSHO-FAIRU" (in Japanese), the last constituent word "FAIRU" (in Japanese) of this composite word "BUNSHO-FAIRU" (in Japanese) can be extracted as the guessed broader category word.

On the other hand, the original sentence information 1 has "1" as the original sentence ID (sid) and "0–12" as the registration knowledge correspondence information (mds), so as to indicate that it is a word located from the 0th byte to 12th byte of the sentence number 1 in the original sentence. Similarly, the original sentence information 2 has "3" as the original sentence ID (sid), "10–22" as the registration knowledge correspondence information (mds), so as to indicate that it is a word located from the 10th byte to 22nd byte of the sentence number 3 in the original sentence.

The first and second language correspondence dictionary 7 is a dictionary collecting the standard second language corresponding words for various first language words, which can be furnished by the translation dictionary used in the usual machine translation system. Here, in general, a plurality of second language corresponding words are provided for each first language word.

The correspondence evaluation and selection unit 8 receives the output of the registration character string extraction unit 6 which is a set of the registration knowledge information and the original sentence information representing a knowledge registration character string candidate, and selectively outputs the corresponding sentences in the second language containing a translation of this knowledge registration character string candidate.

Figure 6:
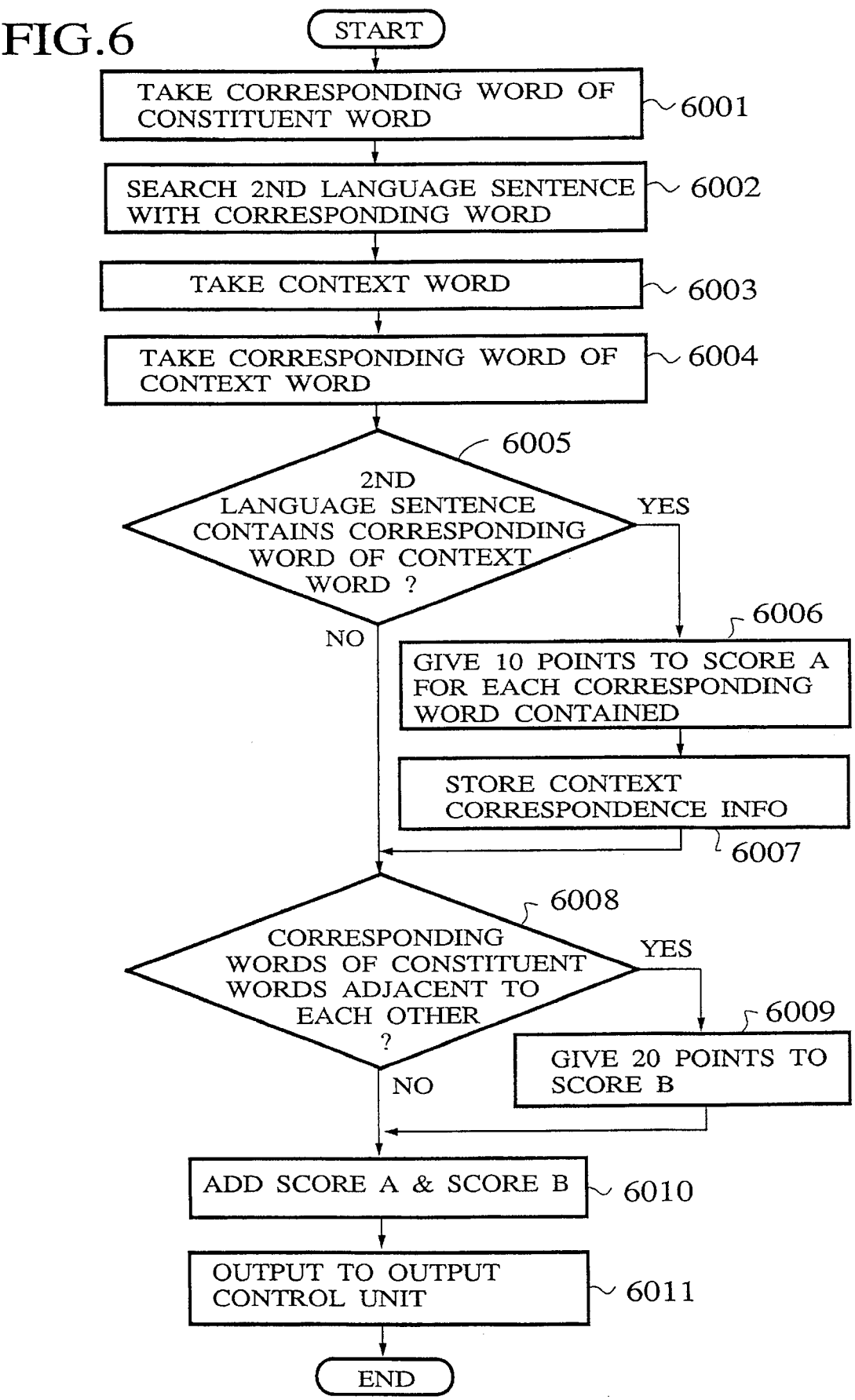
FIG. 6 is a flow chart for one operation of the correspondence evaluation and selection unit of FIG. 5.

This correspondence evaluation and selection unit 8 has a detailed configuration as shown in FIG. 5 which operates according to the flow chart of FIG. 6 for an exemplary case in which the knowledge registration character string candidate indicated by the output of the registration character string extraction unit 6 is a composite word formed as a combination of a plurality of words, as follows.

At the step 6001, the corresponding word searching unit 801 takes out the second language corresponding word for each first language constituent word of this composite word by using the first and second language correspondence dictionary 7. Here, for the first constituent word "BUNSHO" (in Japanese), there are three corresponding words "text", "document", and "letter" (in English), and for the second constituent word "FAIRU" (in Japanese), there are two corresponding words "file" and "filing" (in English). These corresponding words are then stored in the corresponding word data unit 802.

At the step 6002, the second language sentence searching unit 803 searches out the sentences in the second language documents which contains at least one of the corresponding words of each of the constituent words obtained at the step 6001. In the example of FIG. 3, the translated sentence of the sentence number "1" which contains "Document file", the translated sentence of the sentence number "2" which contains "document file", the translated sentence of the sentence number "3" which contains "document files", the translated sentence of the sentence number "12" which contains "text files", and the sentence number "17" which contains "files for the text" are obtained by this search. Here, the words contained in the translated sentences are applied with an internal processing for recovering their standard basic forms in advance so that "Document" is treated as "document" while "files" is treated as "file".

Then, for each translated sentence obtained in this manner, the translated sentence information indicating the reason why each translated sentence has been retrieved by the search is registered. Here, as shown in FIG. 4C, the translated sentence information includes a translated sentence ID, a score, a registration knowledge correspondence information, and a context correspondence information, where the translated sentence ID indicates a sentence number of the retrieved translated sentence, while the registration knowledge correspondence information indicates a number of bytes from the top of the translated sentence at which the corresponding word used as the searching key starts and a number of bytes from the top of the translated sentence at which the corresponding word used as the searching key ends as well as a type of expression in which the corresponding word used as the searching key appears in the translated sentence. The score and the context correspondence information will be described in detail later. In the above described example, as shown in FIG. 4B, the translated sentence information 2-1 has "1" as the translated sentence ID (sid) and "0–14 ="document file"" as the registration knowledge correspondence information, (tgtcand), while the translated sentence information 2-5 has "17" as the translated sentence ID (sid) and "6–24="file for the text"" as the registration knowledge correspondence information (tgtcand), for example.

Then, from the step 6003 onward, each translated sentence taken out at the step 6002 is evaluated by the evaluation unit 805. Here, the evaluation according to the context and the evaluation according to the adjacency of the constituent words are used together to give the score in a form shown in FIG. 7.

First, the evaluation according to the context is carried out between steps 6003 and 6006. At the step 6003, a context word which is a word in the original sentence which is related to the knowledge registration character string in a sense that they both appear in the same sentence is taken out by the context word searching unit 806 using the first language sentence searching unit 804. Here, in a case the knowledge registration character string is a noun, the context word can be a declinable word declined by that noun, or a declinable word or noun which modifies that noun, whereas in a case the knowledge registration character string is a verb, the context word can be a noun which is a case element of that verb, for example. It is also possible to select all the nouns or content words contained in the same sentence as the context words. Here, as an example, it is assumed that five words of "HONSETSU (Japanese word generically meaning this section)", "SAKUSEI (Japanese word generically meaning create)", "SOUSA (Japanese word generically meaning operation)", "TEJUN (Japanese word generically meaning procedure)", and "SETSUMEI (Japanese word generically meaning describe)" are selected as the context words for the original sentence of the sentence number 3 in FIG. 2. These selected context words are then stored in the context word data unit 807.

At the step 6004, the for all the context words selected at the step 6003 and stored in the context word data unit 807, the second language corresponding words are taken out by the corresponding word searching unit 801 using the first and second language correspondence dictionary 7. Here, as an example, it is assumed that the corresponding words "this section" and "current section" are obtained for "HONSETSU" (in Japanese), the corresponding words "create", "creation", "make", "produce" and "production" are obtained for "SAKUSEI" (in Japanese), the corresponding words "operation" and "manipulation" are obtained for "SOUSA" (in Japanese), the corresponding words "procedure", "process", and "step" are obtained for "TEJUN" (in Japanese), and the corresponding words "explain", "explanation", "describe", "description" and "show" are obtained for "SETSUMEI" (in Japanese).

At the step 6005, for each translated sentence taken out at the step 6002, whether any of the second language corresponding words of the context words is contained or not is judged. Here, each translated sentence is searched by the second language sentence searching unit 803 according to the translated sentence ID in the translated sentence information, and 10 points are given to the score A for each corresponding word contained therein at the step 6006, while each corresponding word contained therein is stored in the context correspondence information in the translated sentence information at the step 6007. When there is no corresponding word contained therein, these steps 6006 and 6007 are skipped.

In the above described example, the translated sentence information 2-1 contains the corresponding word "creation" of the context word "SAKUSEI" (in Japanese) so that 10 points are given to the score A, the translated sentence information 2-2 contains the corresponding word "create" of the context word "SAKUSEI" (in Japanese) so that 10 points are given to the score A, the translated sentence information 2-3 contains the corresponding words "this section", "described" and "create" for the context words "HON-SETSU", "SETSUMEI", and "SAKUSEI" (all in Japanese) so that 30 points are given to the score A, the translated sentence information 2-4 contains no corresponding word so that the score A is 0, and the translated sentence information 2-5 contains the corresponding word "show" for the context word "SETSUMEI" (in Japanese) so that 10 points are given to the score A. The resulting scores A for these translated sentence information 2-1 to 2-5 are indicated in the table shown in FIG. 7.

At the step 6007, the corresponding words of the context words contained in each translated sentence information are stored in the context correspondence information in the translated sentence information as already mentioned. Here, the context correspondence information is given as a set of a position of the context word in the original sentence and a position of the corresponding word in the translated sentence. When the corresponding words for more than one context words are contained, the above described sets for all these corresponding words are enumerated. For example, in a case of the translated sentence information 2-3, a set "0–4/0–12" is stored for the corresponding word "this section" of the context word "HONSETSU" (in Japanese) located from the 0th byte to 4th byte in the original sentence which is contained from 0th byte to 12th byte in the translated sentence, a set "24–28/30–36" is stored for the corresponding word "create" of the context word "SAKUSEI" (in Japanese) located from the 24th byte to 28th byte in the original sentence which is contained from 30th byte to 36th byte in the translated sentence, and a set "48–52/13–22" is stored for the corresponding word "describes" of the context word "SETSUMEI" (in Japanese) located from the 48th byte to 52nd byte in the original sentence which is contained from 13th byte to 22nd byte in the translated sentence, so that the context correspondence information as a whole is given in a form of "context=(0–4/0–12, 24–28/30–36. 48–52/13–22).

Next, at the step 6008, the evaluation according to the adjacency of the constituent words is carried out as follows. Namely, the knowledge registration character string "BUN-SHO-FAIRU" (in Japanese) of the above described example is a composite word in which the constituent words "BUN-SHO" and "FAIRU" (both in Japanese) are adjacent to each other. Thus, whether the corresponding words of these constituent words are also adjacent to each other in the translated sentence or not is judged at this step 6008, and if so, 20 points are given to the score B at the step 6009, whereas otherwise this step 6009 is skipped. In the above described example, the translated sentence information 2-1 has "Document" and "file" adjacent to each other so that 20 points are given to the score B, the translated sentence information 2-2 has "document" and "file" adjacent to each other so that 20 points are given to the score B, the translated sentence information 2-3 has "document" and "files" adjacent to each other so that 20 points are given to the score B, and the translated sentence information 2-4 has "text" and "files" adjacent to each other so that 20 points are given to the score B, while the translated sentence information 2-5 has "files" and "text" not adjacent to each other so that the score B is 0. The resulting scores B for these translated sentence information 2-1 to 2-5 are indicated in the table shown in FIG. 7.

Then, at the step 6010, the score A given at the step 6006 and the score B given at the step 6009 are added together to obtain the total score of each translated sentence information. In the above described example, the translated sentence information 2-1 has 10+20=30 points in total, the translated sentence information 2-2 has 10+ 20=30 points in total, the translated sentence information 2-3 has 30+20=50 points in total, the translated sentence information 2-4 has 0+20=20 points in total, and the translated sentence information 2-5 has 10+0=10 points in total. These total scores for the translated sentence information 2-1 to 2-5 are indicated in the table shown in FIG. 7.

Here, the score may be given by utilizing information other than the context words and the adjacency of the constituent words. For example, when there are many one-to-one correspondence between the original sentences and the translated sentences, a number of constituting words of each sentence in the original sentence can be compared with a number of constituting words of each sentence in the translated sentence, and the higher score can be given to a case with closer word numbers to determine the correspondence between the original sentences and the translated sentences. Also, instead of giving some points to each context word whose corresponding word is contained in the translated sentence, the score can be defines as a certain constant multiple of a ratio of a number of constituting words of the original sentence or the translated sentence with respect to the a number of context words whose corresponding words are contained in the translated sentence such that the different lengths of different sentences can be taken into account.

Finally, at the step 6011, the translated sentence information is outputted as the evaluation result to the output control unit 9.

Figures 7, 8:
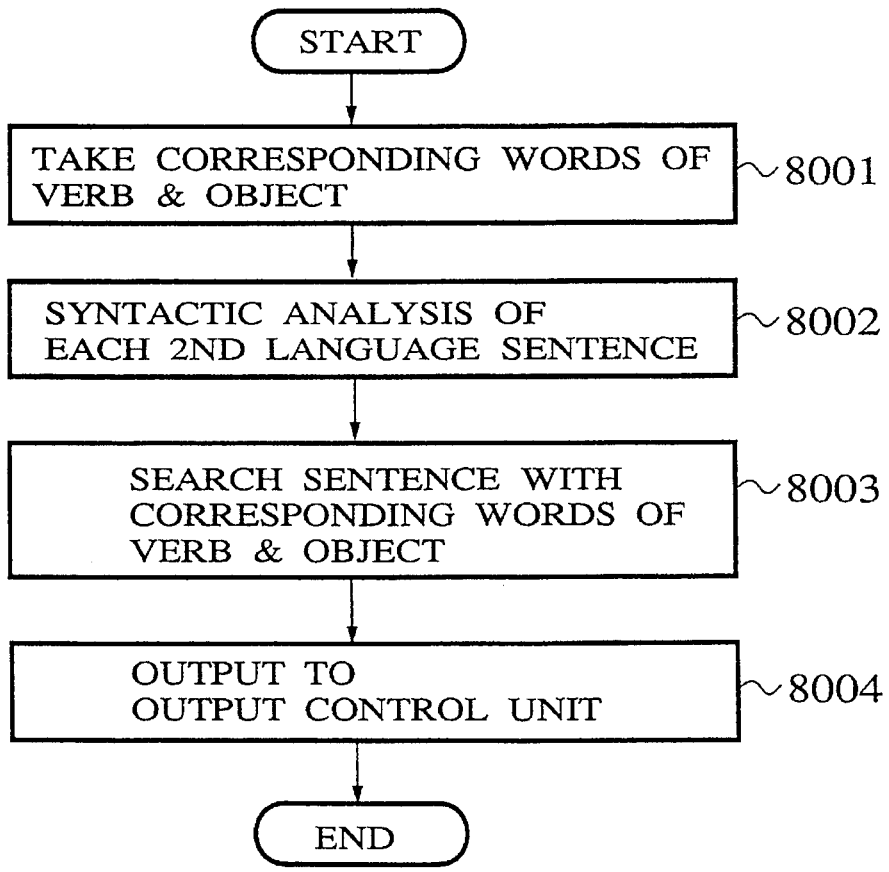
FIG. 7 is a table showing exemplary scores obtained by the operation of FIG. 6.
FIG. 8 is a flow chart for another operation of the correspondence evaluation and selection unit of FIG. 5.

On the other hand, in a case of controlling the translation of a verb according to a combination of a verb and its object, the operation according to the flow chart of FIG. 8 is carried out as follows.

Namely, when the original sentences in the first language (Japanese) are as shown in FIG. 9, the registration character string extraction unit 6 extracts a set of verb and its object as the knowledge registration character string according to the syntactic analysis result of each original sentence. In this case, the resulting registration knowledge information 1 to 3 are as shown in FIG. 11. For example, the registration knowledge information 1 represents the result of extracting "TOKUCHOU WO MOTTEIRU" (Japanese phrase meaning has features) in the original sentence of the sentence number "1", which has "DOSHI-MEISHI" (Japanese phrase meaning verb+noun) as the type (type), "MOTSU" (Japanese word generically meaning have) as the header character string (midashi), "DOSHI" (Japanese word meaning verb) as the part of speech (hinshi), "have" (in English) as the translation in the standard basic form (deftgt), and the other information including "TOKUCHOU" (Japanese word generically meaning feature) as the object (object), and "HYOJUN" (Japanese word meaning standard) as the type of dictionary (dict). Also, as shown in FIG. 11, the original sentence information 1 has "1" as the original sentence ID (sid), "34–38" as the registration knowledge correspondence information (mds) indicating that "MOTSU" is a word located from the 34th byte to 38th byte of the sentence number 1 in the original sentence, and "24–28" as the position of the object "TOKUCHOU" (in Japanese) in the original sentence (obj) indicating that "TOKUCHOU" (in Japanese) is a word located from the 24th byte to 28th byte of the sentence number 1 in the original sentence.

Then, at the step 8001, the corresponding word searching unit 801 takes out the second language corresponding word for the verb and its object in the first language by using the first and second language correspondence dictionary 7. Here, as an example, it is assumed that seven words of "have", "include", "hold", "support", "own", "possess", and "keep" are obtained as the corresponding words of "MOTSU" (in Japanese), and three words of "feature", "characteristic", and "attribute" are obtained as the corresponding words of "TOKUCHOU" (in Japanese).

Next, each second language sentence in the second language documents as shown in FIG. 10 are syntactically analyzed at the step 8002, and according to the syntactic analysis result, those second language sentences which contains the corresponding words of a verb and its object set, i.e., those which contains any one of "have", "include", "hold", "support", "own", "possess", and "keep" as the verb, and any one of "feature", "characteristic", and "attribute" as its object, is searched at the step 8003.

Here, the translated sentence of the sentence number "1" which contains the verb "has" and its object "features" is taken out as the search result. For this translated sentence, the translated sentence information 1-1 in FIG. 11 has "1" as the translated sentence ID (sid), "12–15="have"" as the registration knowledge correspondence information (tgtcand) according to the position of "have" in this translated sentence and its standard basic form, and "21–29="feature"" as the object (objcand) according to the position of "features" in this translated sentence and its standard basic form.

Similarly, for a verb and object combination "TOTTE WO MOTSU" (Japanese phrase meaning hold a knob) in the original sentence of the original sentence number "15", the registration knowledge information 2 and the translated sentence information 2-1 are stored as shown in FIG. 11, and for a verb and object combination "BUHIN WO MOTSU" (Japanese phrase meaning support a part) in the original sentence of the original sentence number "28", the registration knowledge information 3 and the translated sentence information 3-1 are stored as shown in FIG. 11.

In the above described step 8003, a set in which both of the corresponding word of the verb and the corresponding word of the object are matching has been taken out, but when there is no set which matches with both of them, it is also possible to take out a set which matches with one of them while assuming the other. For example, for the verb and object combination "TOKUCHOU WO MOTSU" (in Japanese), a sentence such as "This system has a lot of good functions" can be taken out, by assuming that the corresponding word of TOKUCHOU" (in Japanese) is "function" (in English). Here, in order to indicate this assumption, the translated sentence information 1-1a in FIG. 11 has "21–30= "function"" as another registration knowledge correspondence information (objcand). Similarly, for the same verb and object combination, a sentence such as "This system provides a lot of good functions" can be taken out, by assuming that the corresponding word of "MOTSU" (in Japanese) is "provide" (in English). Here, in order to indicate this assumption, the translated sentence information 1-1b in FIG. 11 has "12–20="provide"" as the registration knowledge correspondence information (tgtcand).

Finally, at the step 8004, the translated sentence information is outputted as the extraction result to the output control unit 9.

By this operation of FIG. 8, it is possible to register the knowledge required in translating the verb "MOTSU" (in Japanese) differently, as "have", "hold", or "support" (all in English) in the example of FIG. 11, according to the difference in its object. It is also possible to obtain the correspondence relationship between the original sentence and the translated sentence for "noun+"NO"+noun" type of expression in Japanese by the similar procedure as that of FIG. 8 described above for a verb and object combination.

Next, the operation of the output control unit 9 will be described in detail. This output control unit 9 edits the information obtained by the operation of the system up to this point as described above in appropriate format and outputs the edited information for presentation to the user. Here, the output presentation format can be chosen from various types according to the types of the dictionary creation operation.

Figure 12:
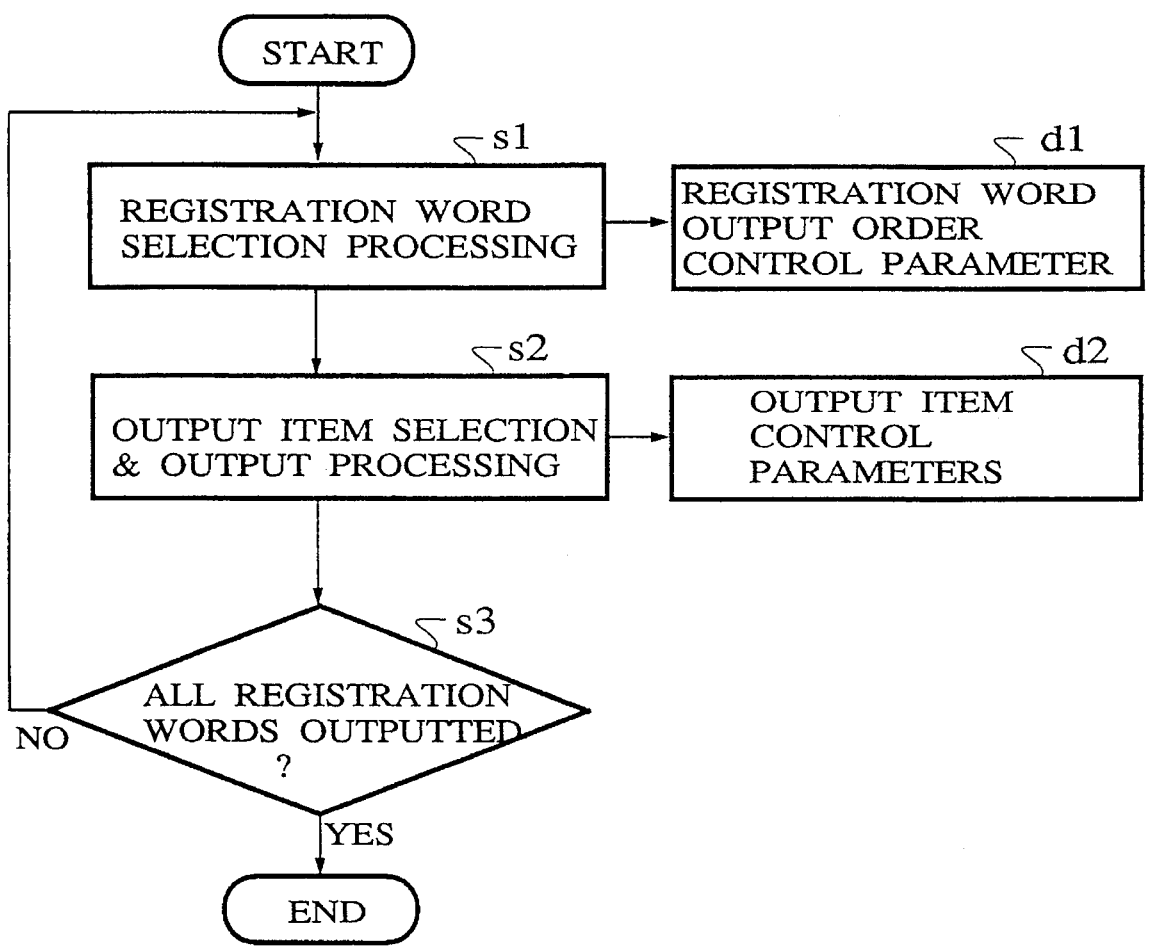
FIG. 12 is a flow chart for the operation of an output control unit in the system of FIG. 1.

The output control unit 9 outputs the dictionary creation support information by looking up the contents of the output information source file as shown in FIG. 4C, the original sentence information file as shown in FIG. 2, and the translated sentence information file as shown in FIG. 3. Here, the registration knowledge information, the original sentence information, and the translated sentence information are collectively outputted to files according to the flow chart of FIG. 12 as follows.

In short, the element in the output information source file is selected according to the values of the registration word output order control parameter d1 by the registration word selection processing s1, and the selected element is outputted in a prescribed format according to the values of the output item control parameters d2 by the output item selection and output processing s2. Then, this operation of the steps s1 and s2 is repeated until all the registration words are outputted at the step s3.

The registration word selection processing s1 has a function for selecting the element in the output information source file according to the registration word output order control parameter d1 which can take one of the four values including an appearance order, a sorting order, a frequency order, and a certainty level order.

The appearance order value of the registration word output order control parameter d1 indicates an output form in which the registration knowledge information is outputted in an order of appearances in the original sentences. For example, when the original sentences (in Japanese) are those of the sentence numbers 1, 2, and 3 shown in FIG. 2 and the composite words are to be outputted as the registration candidates, the registration knowledge information of the composite words "BUNSHO-FAIRU" (Japanese word generically meaning document file), "SAKUSEI-TAISHO-FAIRU" (Japanese word generically meaning creation target file), "PUROGURAMU-FAIRU" (Japanese word generically meaning program file), "JIKKO-MOJURU-FAIRU" (Japanese word generically meaning execution module file), and "SOUSA-TEJUN" (Japanese word generically meaning operation procedure) are outputted in this order as these composite words appear in this order in the original sentences. In this case, the operation of the registration word selection processing s1 proceeds as follows.

(1) The output information source file is searched to take out the element for which the sentence number of the original sentence information is the smallest and the value of its superficial position (a value of "mds") is the smallest. This element is set as the element 1.

(2) The element 1 is deleted from the output information source file.

(3) The output information source file is searched to take out the elements having the same registration knowledge information as the element 1. These elements are set as the element 2, . . . , element N.

(4) The element 2, . . . , element N are deleted from the output information source file.

(5) The operation proceeds to the output item selection and output processing s2 with the element 1, element 2, . . . , element N.

In the output item selection and output processing s2, a part of the element 1 among the element 1, element 2, . . . , element N is outputted. Here, by the processing of (1) described above, the character string of the registration word which appears first in the document is obtained, so that the presentation of the original sentence information in the appearance order is possible at this point. Consequently, the manner of setting up the order among the element 2, . . . , element N in the processing of (3) described above is arbitrary, and there are several possible choices.

For example, it is possible to order them in a descending order of the certainty level, or in the appearance order. Here, the certainty level order is the order of the score in the translated sentence information for each element, so that the high certainty level indicates that the correspondence relationship between the original sentence and the translated sentence is better and the possibility for containing the correct translation is higher.

The sorting order value of the registration word output order control parameter d1 indicates the output form in which the registration knowledge information is outputted in an order of sorting according to the registration information character string such as the header. For example, when the original sentences (in Japanese) are those of the sentence numbers 1, 2, and 3 shown in FIG. 2 and the katakana words are to be outputted as the registration candidates in the Japanese alphabetical sorting order, the registration knowledge information of the katakana words "FAIRU", "PUROGURAMU", and "MOJURU" (all in Japanese) are outputted in this order according to their Japanese alphabetical order. In this case, the operation of the registration word selection processing s1 proceeds as follows.

(1) The output information source file is searched to take out the element for which the sorting order of its superficial registration form (a character string of "midashi") is the smallest. This element is set as the element 1.

(2) The element 1 is deleted from the output information source file.

(3) The output information source file is searched to take out the elements having the same registration knowledge information as the element 1. These elements are set as the element 2, . . . , element N.

(4) The element 2, . . . , element N are deleted from the output information source file.

(5) The operation proceeds to the output item selection and output processing s2 with the element 1, element 2, . . . , element N.

The frequency order value of the registration word output order control parameter d1 indicates the output form in which the registration knowledge information is outputted in an order of its frequency of appearances. For example, when the original sentences (in Japanese) are those of the sentence numbers 1, 2, and 3 shown in FIG. 2 and the composite words are to be outputted as the registration candidates in the frequency order, the registration knowledge information of the composite words "BUNSH0-FAIRU", "SAKUSEI-TAISHO-FAIRU" "PUROGURAMU-FAIRU", "JIKKO-MOJURU-FAIRU", and "SOUSA-TEJUN" (all in Japanese) are outputted in this order. Here, those words which have the same frequency of appearances are arranged in the order of their appearances. In this case, the operation of the registration word selection processing s1 proceeds as follows.

(1) The output information source file is searched to take out the elements with the highest appearance frequencies. These elements are set as the element 1, . . . , element N.

(2) The element 1, . . . , element N are deleted from the output information source file.

(3) The operation proceeds to the output item selection and output processing s2 with the element 1, . . . , element N.

The certainty level order value of the registration word output order control parameter d1 indicates the output form in which the registration knowledge information is outputted in an order of their scores. In this case, the operation of the registration word selection processing s1 proceeds as follows.

(1) The output information source file is searched to take out the element for which the sentence number of the translated sentence is the smallest and its superficial position (a value of "mds") is the smallest. This element is set as the element 1.

(2) The element 1 is deleted from the output information source file.

(3) The output information source file is searched to take out the elements having the same registration knowledge information as the element 1. These elements are set as the element 2, . . . , element N.

(4) The element 2, . . . , element N are deleted from the output information source file.

(5) The operation proceeds to the output item selection and output processing s2 with the element 1, element 2, . . . , element N.

By processing as described above, the element 1, . . . , element N are selected by the registration word selection processing s1 and transmitted to the output item selection and output processing s2. Then, at the output item selection and output processing s2, the information to be outputted is processed according to the value of the output item control parameters d2. Here, the transmitted elements include the registration knowledge information, the original sentence information, and the translated sentence information as already described above, where the registration knowledge information is outputted by being converted into a suitable form such as the dictionary registration format. Here, all the N elements transmitted from the registration word selection processing s1 have the same registration knowledge information, and each of them has one original sentence information and a plurality of translated sentence information. For this reason, N pieces of the original sentence information and N or more pieces of the translated sentence information are going to be provided with respect to one type of registration knowledge information.

The output item control parameters d2 includes four parameters of "original sentence information number", "translated sentence information number", "correspondence display type", and "correspondence display form". The "original sentence information number" specifies how many pieces of the original sentence information are to be outputted, while the "translated sentence information number" specifies how many pieces of the translated sentence information are to be outputted for each piece of the original sentence information to be outputted. The "correspondence display type" controls the use of the display for two types of information including "correspondence relationship of the original sentence and the translated sentence in the registration knowledge information" and "correspondence relationship of the original sentence and the translated sentence in the matching context". Also, the "correspondence display form" specifies the form for displaying the correspondence portion in distinction to the other portions, to be in any one of various usually used forms such as the underlining form, the bracketing form, the highlighting form, etc.

These registration word output order control parameter d1 and output item control parameters d2 can be set up and changed from the usual user input means such as the mouse and the keyboard.

Now, the concrete examples of the output form will be described for an exemplary case in which the original sentences (in Japanese) are those of the sentence numbers 1, 2, and 3 shown in FIG. 2 and the translated sentences (in English) are those of the sentence numbers 1, 2, and 3 shown in Fig.

FIG. 13 shows the exemplary output form in a case the registration word output order control parameter value is the appearance order, the original sentence information number is 2, the translated sentence information number is 2, the correspondence display type is the display of the correspondence relationship between the original sentence and the translated sentence in the registration knowledge information, and the correspondence display form is the is highlighting form.

In the first line, "BUNSHO-FAIRU" (in Japanese) is a header word of the word to be registered, "MEISHI" (in Japanese) is its part of speech, "document file")in English) is its translation, and "isa=FAIRU" (in Japanese) is the broader category word information. These items are outputted by being extracted and reconstructed from the registration knowledge information of each element by the output item selection and output processing s2.

The default translation on the second line is obtained by retrieving and outputting the "deftgt" field of the registration knowledge information of each element which indicates the standard translation by the machine translation system.

The third line is obtained by outputting the sentence number "1" and the original sentence taken out from the original sentence information, in a form of [1] at a top of the line and the original sentence itself that follows, with the header portion contained in the original sentence highlighted. Here, the position of the highlighted character string can be obtained from "mds" field contained in the original sentence information. Also, "/" is a mark indicating a dividing position between the constituent words in the composite word.

The fourth and fifth lines shows two pieces of the translated sentence information and their sentence numbers (1) and (3) with respect to the original sentence [1] of the third line. Here, the sentence number and the translated sentence are taken out from the translated sentence information, and outputted with the translation candidate portion contained in the translated sentence highlighted. Here, if desired, the display form for the translated sentence can be different from that of the original sentence.

In this example, the registration word output order control parameter is set to be the appearance order, so that the "BUNSHO-FAIRU" (in Japanese) used in the original sentence with the sentence number 1 which appears first in the original document is transmitted as the element 1. The second and subsequent elements are selected according to the certainty level (score) as described above, so that the "BUNSHO-FAIRU" (in Japanese) used in the original sentence with the sentence number 3 is transmitted as the element 2, and the "BUNSHO-FAIRU" (in Japanese) used in the original sentence with the sentence number 2 is transmitted as the element 3. For the original sentence information and the translated sentence information to be outputted first, the output item selection and output processing s2 uses the the original sentence information and the translated sentence information of the element 1 as shown in FIG. 13. Also, as the original sentence information number is set to be 2, so that the second original sentence information and translated sentence information are outputted as the original sentence [3] and the translated sentences (3) and (1).

Here, what is to be outputted as the second information is determined by the registration word selection processing s1. In the example shown in FIG. 13, the element 3 corresponding to the third original sentence is selected and outputted according to its certainty level. The third and subsequent elements are not outputted because of the limitation on the original sentence information number. Also, because of the setting of the translated sentence information number to be 2, the output item selection and output processing s2 limits the number of the outputted translated sentence information to be at most two.

FIG. 14 shows the exemplary output form in a case the extraction target is the composite word, the registration word output order control parameter value is the frequency order, the original sentence information number is 1, the translated sentence information number is 2, the correspondence display type is the display of the correspondence relationship between the original sentence and the translated sentence in the registration knowledge information and the correspondence relationship between the original sentence and the translated sentence in the matching context, and the correspondence display form is the highlighting form. Here, it is assumed that the composite word with the highest frequency of appearances in the document is "BUNSHO-FAIRU" (in Japanese) and the composite word with the second highest frequency of appearances in the document is "PUROGURAMU-FAIRU" (in Japanese).

Also, according to the context correspondence information contained in each element, the elements in correspondence relationship between the original sentence and the translated sentence are outputted with respective types of the underlines. In this case, it is difficult to comprehend the correspondence relationship when only one type of the display form is used, so that a plurality of different types of the underlines are used for different correspondence relationships. When the color display is available, it is also possible to utilize the different colors for different correspondence relationships.

By creating the dictionary registration candidate data in this form, the user can edit this data on the computer directly until the desired final registration form is obtained. Usually, the machine translation system has a function for collectively registering the user dictionary, so that by setting the output data of this dictionary creation support system to this user dictionary registration format and ignoring the original sentence information and the translated sentence information other than the registration knowledge information at a time of the registration by treating them as comments, it becomes possible to create the user dictionary easily from the input original and translated documents.

It is to be noted that the above embodiment has been described for a case of outputting the registration knowledge information, the original sentence information, and the translated sentence information in the file format, but it is also possible to use the output format for enabling the interactive display and editing of these information.

In such a case, the registration knowledge information can be displayed in a manner in which the original sentence information and the translated sentence information related to this registration knowledge information are apparent, or a manner in which the correspondence relationship between the original sentence and the translated sentence is also displayed.

It is also to be noted that the above embodiment has been described for a case of creating the user dictionary by entering the original sentence information and the translated sentence information, but it is also possible to modified this manner of creating the user dictionary such that only the original sentence information is entered, the word portions or the verb portions are extracted from this original sentence information, and appropriate or desired translation is either entered directly or specified among the translations resulting from the dictionary looking up. In this manner, it becomes possible to omit the task of checking the technical terms in the translated sentence as long as the technical terms alone are specified or entered in advance.

As described, according to the present invention, using the already existing original document and the translated document as inputs, it becomes possible to output the candidates for the registration data to be registered in the user dictionary or the user rule dictionary, while also outputting the original sentence information and the translated sentence information which are useful at a time of editing the registration data candidates. As a result, it becomes possible for the user to easily look up the original sentence information and the translated sentence information along with the related registration data candidate information, so that the creation of the dictionary registration data becomes extremely easy.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for supporting a creation of a dictionary for a translation system which translates a first language into a second language, comprising the steps of:

entering a first language document and a corresponding second language document;

extracting each first language character string to be registered in the dictionary from the first language document entered at the entering step;

selectively extracting each corresponding second language character string with respect to each first language character string from the corresponding second language document according to a level of correspondence between a section of the first language document from which each first language character string is extracted and a section of the corresponding second language document to which each corresponding second language character string belongs, by morphologically and syntactically analyzing the first language document and the second language document; and selectively outputting each first language character string extracted at the extracting step along with each corresponding second language character string extracted at the selectively extracting step as a candidate for a registration knowledge to be registered in the dictionary according to the level of correspondence.

2. The method of claim 1, further comprising the step of specifying a type of each first language character string to be extracted at the extracting step such that the extracting step extracts only the first language character string of the specified type.

3. The method of claim 1, wherein the selectively extracting step extracts each corresponding second language character string with respect to each extracted first language character string according to a first and second language correspondence dictionary storing corresponding words in the first and second languages.

4. The method of claim 3, wherein the selectively extracting step extracts each section of the second language document which contains a corresponding word of each first language character string according the first and second language correspondence dictionary, and selectively extracts each corresponding second language character string according to a level of correspondence between a section of the first language document from which each first language character string is extracted and each section of the corresponding second language document to which each corresponding second language character string belongs.

5. The method of claim 4, wherein the selectively extracting step extracts each corresponding second language character string from each section of the corresponding second language document which has a corresponding word for a context word in a section of the first language document from which each first language character string is extracted.

6. The method of claim 4, wherein the selectively extracting step extracts each corresponding second language character string from each section of the corresponding second language document which has corresponding words for constituent words of each first language character string which are arranged in an identical manner as the constituent words of each first language character string are arranged in the first language.

7. The method of claim 4, wherein the selectively extracting step extracts each corresponding second language character string from each section of the corresponding second language document which has a corresponding word for an object of each first language character string as an object of each corresponding second language character string.

8. The method of claim 1, wherein the selectively outputting step outputs each first language character string and each corresponding second language character string in any of an order of appearances of each first language character string in the first language document, an order in which the first language character strings are sorted, an order of frequency of appearances of each first language character string in the first language document, and an order of certainty levels of the first language character strings.

9. The method of claim 1, wherein the selectively outputting step also outputs in correspondence an information concerning a section of the first language document from which each first language character string is extracted and an information concerning each section of the second language document from which each corresponding second language character string is extracted.

10. The method of claim 1, further comprising the step of selectively registering each candidate for a registration knowledge outputted at the selectively outputting step, into the dictionary.

11. A system for supporting a creation of a dictionary for a translation system which translates a first language into a second language, comprising:

means for entering a first language document and a corresponding second language document;

means for extracting each first language character string to be registered in the dictionary from the first language document entered by the entering means;

means for selectively extracting each corresponding second language character string with respect to each first language character string from the corresponding second language document according to a level of correspondence between a section of the first language document from which each first language character string is extracted and a section of the corresponding second language document to which each corresponding second language character string belongs, by morphologically and syntactically analyzing the first language document and the second language document; and means for selectively outputting each first language character string extracted by the extracting means along with each corresponding second language character string extracted by the selectively extracting means as a candidate for a registration knowledge to be registered in the dictionary according to the level of correspondence.

12. The system of claim 11, further comprising means for specifying a type of each first language character string to be extracted by the extracting means such that the extracting means extracts only the first language character string of the specified type.

13. The system of claim 11, wherein the selectively extracting means extracts each corresponding second language character string with respect to each extracted first language character string according to a first and second language correspondence dictionary storing corresponding words in the first and second languages.

14. The system of claim 13, wherein the selectively extracting means extracts each section of the second language document which contains a corresponding word of each first language character string according the first and second language correspondence dictionary, and selectively extracts each corresponding second language character string according to a level of correspondence between a section of the first language document from which each first language character string is extracted and each section of the corresponding second language document to which each corresponding second language character string belongs.

15. The system of claim 14, wherein the selectively extracting means extracts each corresponding second language character string from each section of the corresponding second language document which has a corresponding word for a context word in a section of the first language document from which each first language character string is extracted.

16. The system of claim 14, wherein the selectively extracting means extracts each corresponding second language character string from each section of the corresponding second language document which has corresponding words for constituent words of each first language character string which are arranged in an identical manner as the constituent words of each first language character string are arranged in the first language.

17. The system of claim 14, wherein the selectively extracting means extracts each corresponding second language character string from each section of the corresponding second language document which has a corresponding word for an object of each first language character string as an object of each corresponding second language character string.

18. The system of claim 11, wherein the selectively outputting means outputs each first language character string and each corresponding second language character string in any of an order of appearances of each first language character string in the first language document, an order in which the first language character strings are sorted, an order of frequency of appearances of each first language character string in the first language document, and an order of certainty levels of the first language character strings.

19. The system of claim 11, wherein the selectively outputting means also outputs in correspondence an information concerning a section of the first language document from which each first language character string is extracted and an information concerning each section of the second language document from which each corresponding second language character string is extracted.

20. The system of claim 11, further comprising means for selectively registering each candidate for a registration knowledge outputted by the selectively outputting means, into the dictionary.

21. A method for supporting a creation of a dictionary for a translation system which translates a first language into a second language, comprising the steps of:

entering a first language document and a corresponding second language document;

extracting each first language character string and each corresponding second language character string from the first language document and the corresponding second language document entered at the entering step, respectively;

evaluating a level of correspondence between each first language character string and each corresponding second language character string extracted at the extracting step according to a first and second language correspondence dictionary storing corresponding words in the first and second languages, by morphologically and syntactically analyzing the first language document and the second language document; and selectively outputting each first language character string and each corresponding second language character string as a candidate for a registration knowledge to be registered in the dictionary according to the level of correspondence evaluated at the evaluating step.

22. The method of claim 21, wherein the selectively outputting step also outputs in correspondence an information concerning a section of the first language document from which each first language character string is extracted and an information concerning each section of the second language document from which each corresponding second language character string is extracted.

23. The method of claim 21, further comprising the step of selectively registering each candidate for a registration knowledge outputted at the selectively outputting step, into the dictionary.

24. A system for supporting a creation of a dictionary for a translation system which translates a first language into a second language, comprising:

means for entering a first language document and a corresponding second language document;

means for extracting each first language character string and each corresponding second language character string from the first language document and the corresponding second language document entered by the entering means, respectively;

evaluating a level of correspondence between each first language character string and each corresponding second language character string extracted by the extracting means according to a first and second language correspondence dictionary storing corresponding words in the first and second languages, by morphologically and syntactically analyzing the first language document and the second language document; and selectively outputting each first language character string and each corresponding second language character string as a candidate for a registration knowledge to be registered in the dictionary according to the level of correspondence evaluated by the evaluating means.

25. The system of claim 24, wherein the selectively outputting means also outputs in correspondence an information concerning a section of the first language document from which each first language character string is extracted and an information concerning each section of the second language document from which each corresponding second language character string is extracted.

26. The system of claim 24, further comprising means for selectively registering each candidate for a registration knowledge outputted by the selectively outputting means, into the dictionary.

\* \* \* \* \*